(12) United States Patent
Shioya et al.

(10) Patent No.: US 7,651,717 B2
(45) Date of Patent: Jan. 26, 2010

(54) BEVERAGE

(75) Inventors: Yasushi Shioya, Tokyo (JP); Tatsuya Kusaura, Tokyo (JP)

(73) Assignee: Kao Corporation, Tokyo (JP)

( * ) Notice: Subject to any disclaimer, the term of this patent is extended or adjusted under 35 U.S.C. 154(b) by 553 days.

(21) Appl. No.: 10/518,372

(22) PCT Filed: Jun. 27, 2003

(86) PCT No.: PCT/JP03/08201

§ 371 (c)(1), (2), (4) Date: Dec. 28, 2004

(87) PCT Pub. No.: WO2004/002242

PCT Pub. Date: Jan. 8, 2004

(65) Prior Publication Data

US 2005/0147728 A1 Jul. 7, 2005

(30) Foreign Application Priority Data

Jun. 28, 2002 (JP) ............................. 2002-190689
Jun. 28, 2002 (JP) ............................. 2002-190690

(51) Int. Cl.
*A23L 2/00* (2006.01)
(52) U.S. Cl. ..................................... 426/590
(58) Field of Classification Search ............... 424/776, 424/725; 426/629, 590
See application file for complete search history.

(56) References Cited

U.S. PATENT DOCUMENTS

2002/0022062 A1 * 2/2002 Okawa et al. ............... 424/776

FOREIGN PATENT DOCUMENTS

| EP | 1172112 | 1/2002 |
|----|---------|--------|
| EP | 1 186 294 A2 | 3/2002 |
| EP | 1 186 297 A2 | 3/2002 |
| EP | 1 293 130 A1 | 3/2003 |
| JP | 8-23939 | 1/1996 |
| JP | 9-266767 | 10/1997 |
| JP | 2000-63827 | 2/2000 |
| JP | 2000-342219 | 12/2000 |

* cited by examiner

*Primary Examiner*—Carolyn A Paden
(74) *Attorney, Agent, or Firm*—Oblon, Spivak, McClelland, Maier & Neustadt, L.L.P.

(57) ABSTRACT

The present invention provides a beverage comprising: (a) 0.05 to 10% by weight (wt %) of a chlorogenic acids family mixture comprising isochlorogenic acids(s) family wherein the weight content of said isochlorogenic acid(s) ranges from 1/20 to 1/3 of the total ingredient (a); (b) hydroxycarboxylic acid(s) in a quantity ranging from 5 to 30 times the weight content of said ingredient (a) and from 0.25 to 10 wt % of the beverage, and/or vegetable-derived or fruit-derived flavor substance(s) in a quantity ranging from 0.1 to 30 times the weight content of said ingredient (a) and from 0.25 to 10 wt % of the beverage; and (c) 30 to 99.7 wt % of water. The present invention provides a flavorous beverage having a stable antihypertensive action and long-term storage stability.

42 Claims, No Drawings

BEVERAGE

FIELD OF THE INVENTION

The present invention relates to a flavorful beverage having an antihypertensive and other physiological actions as well as long-term storage stability.

BACKGROUND OF THE INVENTION

Heart diseases including angina pectoris, myocardial infarction and cardiac failure, and cerebrovascular disease including cerebral infarction, cerebral hemorrhage and subarachnoid hemorrhage are closely related to hypertension, and ranked second and third as the causes of death of the Japanese, respectively. Further, according to National Livelihood Survey (for fiscal 1998) by the Ministry of Health, Labor and Welfare of Japan, those patients going to clinics or hospitals for treatment of high blood pressure amount to 64 per a population of 1,000, with topping the list of the causes of disease. In other countries, like Japan, these heart diseases and cerebrovascular diseases rank high in the causes of death and the number of sufferers of hypertension continues to increase.

Typical medical means for hypertensives include administration of drugs such as diuretics, sympatholytics agents, vasodilators or angiotensin converting enzyme inhibitors, which are principally applied to severely suffering patients. On the other hand, since general treatments aimed at improving lifestyle habits, such as dietary therapy, exercise therapy, drinking and smoking control, are applicable widely to mildly to severely hypertensive patients, significance of such general treatments is highly acknowledged now. Above all, the improvement in dietary habits is said to be of great importance, and there are many foods traditionally known as having an antihypertensive action. Further, food-derived antihypertensive agents have long been pursued, with the result that a multitude of active substances having an antihypertensive action have so far been separated and identified.

The applicant has studied various food materials to search for any ingredient having an antihypertensive action and found out that chlorogenic acids can show an excellent antihypertensive action (cf. Japanese published unexamined patent applications 2002-53464 and 2002-87977). However, chlorogenic acids have a problem of producing bitterness or astringency when added to foods and drinks, especially beverages. Such bitterness or astringency is so severe particularly in beverages that those beverages are difficult to take in continuously.

Accordingly, the present invention provides a beverage comprising a high concentration of chlorogenic acid(s) which has an antihypertensive action and favorably high storage stability, making it possible to drink even everyday with good flavor.

SUMMARY OF THE INVENTION

The inventor has found out that addition of a specific quantity of hydroxycarboxylic acid(s) and/or vegetable-derived or fruit-derived flavor substance(s) to a chlorogenic acids mixture, controlling of the quantity of the isochlorogenic acids-contained in chlorogenic acid(s) to a specific range are effective in producing a beverage improved in respect of bitterness and astringency which is easy to drink with its fresh flavor and stable over an extended period of time.

More specifically, the present invention provides a beverage comprising the following ingredients (a), (b) and (c):

(a) 0.05 to 10% by weight (wt %) of a chlorogenic acids family mixture comprising isochlorogenic acids wherein the weight content ratio of said isochlorogenic acids is from 1/20 to 1/3 of the chlorogenic acids family mixture;

(b) a hydroxycarboxylic acid in a quantity ranging (1) from 5 to 30 times the weight of said ingredient (a) and (2) from 0.25 to 10% by weight of the beverage, and/or vegetable-derived or fruit-derived flavor substance(s) in a quantity ranging (1) from 0.1 to 30 times the weight of said ingredient (a) and (2) from 0.25 to 10% by weight of the beverage; and (c) 30 to 99.7% by weight of water.

DETAILED DESCRIPTION OF THE INVENTION

The chlorogenic acids family mixture (ingredient (a)) usable for the beverage of the present invention includes chlorogenic acids such as isochlorogenic acids, neochlorogenic acids and cryptochlorogenic acids and derivatives thereof. Here, the chlorogenic acid is a 5-caffeoylquinic acid in which caffeic acid is ester-bonded to a hydroxyl group at position 5 of the quinic acid, and the cryptochlorogenic acid is a 4-caffeoylquinic acid in which caffeic acid is ester-bonded to a hydroxyl group at position 4 of the quinic acid, and the neochlorogenic acid is a 3-caffeoylquinic acid in which caffeic acid is ester-bonded to a hydroxyl group at position 3 of the quinic acid. The isochlorogenic acid is a dicaffeoylquinic acid in which two caffeic acid molecules are ester-bonded to any two hydroxyl groups out of three hydroxy groups positioned at 3, 4 and 5 of the quinic acid (e.g., 3,4-dicaffeoylquinic acid, 3,5-dicaffeoylquinic acid or 4,5-dicaffeoylquinc acid). Besides, the chlorogenic acids family includes ferulylquinic acids constituted of quinic acid and ferulic acid ester-bonded to a hydroxyl group at one position among positions 3, 4 and 5 of the quinic acid (e.g., 5-ferulylquinic acid), ferulylcaffeoylquinic acids in which caffeic acid and ferulic acid are each independently ester-bonded to any one of the hydroxyl groups positioned at 3, 4 and 5 of the quinic acid (e.g., 3-ferulyl-4-caffeoylquinic acid), and the like. And the derivatives of the isochlorogenic acids and chlorogenic acids family include all their salts and sugar esters that are physiologically acceptable. Among these derivatives, typical salts of the isochlorogenic acids and chlorogenic acids family include their alkaline metal salts such as sodium salts, potassium salts, etc. and alkaline-earth metal salts such as calcium salts, magnesium salts, etc.

For the ingredient (a) above, it is preferred to use plant extracts. The ingredient (a) may be extracted from either a single plant or a mixture of multiple plants. Among the plants, extracts of plants such as beefsteak plant (*Perilla*), sunflower (*Heliantlius*), mugwort (*Artemisia*), sweet potato (batata), green coffee beans, nandina leaf and unripe apple fruit are preferably used and, above all, the extract of green coffee beans, especially extract of seeds of *Coffea arabica* LINNE as extracted in a warmed aqueous solution of ascorbic acid or citric acid or in hot water is preferred. As ingredient (a) may also be used a blend of chemically modified products of such plant extracts.

The content of the isochlorogenic acids in the ingredient (a), namely the weight content of the isochlorogenic acids family in ratio ranges from 1/20 to 1/3 of the total ingredient (a), preferably from 1/15 to 1/4 and more preferably from 1/10 to 1/5. With a weight content ratio of the isochlorogenic acids lower than 1/20 of the total ingredient (a), the resultant beverage will have insufficient stability, while astringency and bitterness will not be sufficiently improved with an isochlorogenic acids content ratio higher than 1/3 of the total weight of the ingredient (a). The weight content ratio may be controlled by blending two or more plant extracts having different chlorogenic acid family contents; by otherwise preparing column-separated, extracted or chemically synthesized chlorogenic acid(s) and blending the same with plant extract(s) as described above; or by selectively eluting chlorogenic acid family by adsorption-desorption process on resin as taught in Japanese published unexamined patent application H09-9603 and blending the same with the plant extract(s) as described above.

Further, the beverage of the present invention contains the ingredient (a) in a quantity ranging from 0.05 to 10 wt %, preferably from 0.07 to 5.0 wt % and more preferably from 0.10 to 1.0 wt %. If the content of the ingredient (a) is lower than 0.05 wt %, the resultant beverage cannot have a sufficient antihypertensive action, while with its content higher than 10 wt % a stronger astringency and bitterness will result.

The hydroxycarboxylic acid (ingredient (b)) usable for the beverage of the present invention includes hydroxycarboxylic acids having a molecular weight ranging from 60 to 300 such as lactic acid, citric acid, gluconic acid, glycolic acid, malic acid, tartaric acid, and ascorbic acid. These hydroxycarboxylic acids include those intrinsically contained in natural products, especially in plants, products converted through a chemical processing applied in the course of extraction and/or fractionation, and chemically modified products, and chemically synthesized products. As such hydroxycarboxylic acids derived from natural products, fermented vinegars subject to Japanese Agricultural Standards or extracts thereof may be used. The term "fermented vinegar(s)" used herein refers to vinegars produced by an acetic fermentation process and more specifically to cereal vinegars made from rice or other cereals, such as a cereal vinegar called "kurozu" prepared from brown rice and koji through a one-step static fermentation process, fruit vinegars from apples, grapes or other fruits, other fermented vinegars than the cereal and fruit vinegars, and the like. To prepare the hydroxycarboxylic acids for the beverage of the present invention, juices or extracts thereof may also be used, specifically including juices of oranges, mandarin oranges, apples, grapes, pines, peaches, grapefruits, lemons, pears, Japanese pears, Japanese apricots, navel oranges, strawberries, passion fruits, melons, limes, guavas, apricots, *Shekwashas, Citrus sphaerocarpa, ponkan* (*Citrus reticulate*), iyokan (*Citrus iyo*), hassaku (*Citrus hassaku*), cranberries, bananas, Japanese plums, mangoes, kiwifruits, persimmons, acerolas, etc., mixtures and concentrates of such juices, and extracts thereof with water, ethanol, methanol, acetic acid, chloroform, dichloromethane, ethyl acetate, n-hexane, acetone, benzene, petroleum ether, ethers, etc. Among these, water extracts or ethanol extracts are preferred.

Of the vegetable-derived and fruit-derived flavor substances (ingredient (b)), the latter flavor substances (fruit flavors) may be obtained from edible genital parts of seed plants, especially such parts associated with seeds that have sweet flesh of fruit. Specifically, such fruit flavors usable for the beverages of the present invention include, for example, those obtained from oranges, mandarin oranges, apples, grapes, pines, peaches, grapefruits, lemons, pears, Japanese pears, Japanese apricots, navel oranges, strawberries, passion fruits, melons, limes, guavas, apricots, *Shekwashas, Citrus sphaerocarpa,* ponkan (*Citrus reticulate*), iyokan (*Citrus iyo*), hassaku (*Citrus hassaku*), cranberries, bananas, Japanese plums, mangoes, kiwifruits, persimmons, and acerolas. Meanwhile, the term "fruit flavor(s)" used herein covers any synthesized flavors used to form fruit flavors obtained from natural sources. Among the fruit flavors, citrus flavors are preferred, including orange, lemon, lime and grapefruit flavors. Fruit flavors of apples, grapes, cherries, pineapples, coconuts, etc. may also be used. These fruit flavors may be obtained from fruit juices, balms or like natural sources, or may be synthesized artificially. Besides, fruit juices including orange, lemon, lime, apple and grape juices may be used for the preparation of flavor substances. Preferably, these flavor substances are provided as their concentrates for convenience of blending.

The vegetable-derived flavor substances for the beverage of the present invention include flavors obtained from roots or leaves of vegetables. Like the fruit flavors described above, the vegetable-derived flavor substances include synthesized flavors. It is preferred to use flavors obtained from carrots, tomatoes, *Jeyred* (a kind of sweet potato), asparagus, Jew's mallow, parsley, spinach, *komatsuna* (*Brassica chinensis komatsuna*), celery, cabbages, green pepper (*Capsicum annuum*), broccoli, radish greens, lettuces, Chinese cabbages, radish roots, ginger, pumpkins, asparagus, eggplants, beets, cresson (watercress), etc. It is also preferred that these vegetable-derived flavor substances be provided as their concentrates for convenience of blending.

The above-described hydroxycarboxylic acids and vegetable-derived or fruit-derived flavor substances may be used singly or in combination of two or more thereof.

The beverage of the present invention contains the hydroxycarboxylic acid(s) in a quantity ranging preferably from 5 to 30 times the weight of the above-described ingredient (a), more preferably from 5 to 20 times and even more preferably from 5 to 15 times. Further, the present beverage contains the hydroxycarboxylic acid(s) in a quantity ranging preferably from 0.25 to 15 wt %, more preferably from 0.25 to 10 wt % and even more preferably from 0.35 to 5 wt %. With a hydroxycarboxylic acid(s) content lower than 5 times the weight of the ingredient (a) or lower than 0.25 wt % of the beverage, the improvement in astringency or in bitterness brought by hydroxycarboxylic acid(s) will not be sufficient, while a hydroxycarboxylic acid(s) content higher than 30 times the weight of the ingredient (a) or higher than 15 wt % of the beverage will result in an overly acid flavor, rendering the beverage unfit for long-lasting drinking.

The beverage of the present invention contains the above-described flavor substance(s) in a quantity ranging from 0.1 to 30 times the weight content of the above described ingredient (a), preferably from 0.5 to 30 times and more preferably from 5 to 20 times. Further, the present beverage contains the flavor substance(s) in a quantity ranging from 0.25 to 15 wt %, preferably from 0.25 to 10 wt % and more preferably from 0.35 to 5 wt %. With a flavor substance(s) content lower than 0.1 times the weight of the ingredient (a) or lower than 0.25 wt % of the beverage, the improvement in astringency or in bitterness brought by the flavor substance(s) will not be sufficient, while a flavor substance(s) content higher than 30 times the weight of the ingredient (a) or higher than 15 wt % of the beverage will result in an overly acid flavor, also rendering the beverage unfit for long-lasting drinking. When the flavors are provided as concentrates, the above-mentioned content is given in terms of soluble solids other than sugars.

Further, the beverage of the present invention contains the ingredient (a) in a quantity ranging from 30 to 99.7 wt %, preferably from 40 to 99.7 wt % and more preferably from 50 to 99.7 wt %. A water content lower than 30 wt % is undesirable because the resultant beverage becomes distasteful and other ingredients are hard to dissolve upon blending.

The beverage of the present invention has a pH ranging preferably from 2 to 5, more preferably from 2.5 to 5 and even more preferably from 3.0 to 5.0 in view of long-term stability of the ingredient (a) having desirable physiological actions.

Further, for carbonated drinks, the beverage of the present invention has a pH preferably in the range from 2.5 to 4.0 and more preferably from 3.0 to 4.0. The beverage of the present invention has its pH controlled through addition of edible acid(s) or edible organic acid(s). Edible organic acids usable for the beverage of the present invention include fumaric acid, adipic acid, acetic acid and mixtures thereof, in addition to the aforementioned hydroxycarboxylic acids. These acids may exist in the beverage either in their undissociated forms or as their salts. Typically, the salts of edible acids usable for the present invention include pharmaceutically acceptable salts such as sodium salts, potassium salts, lithium salts, calcium salts, and magnesium salts.

A sweetener, flavor substance other than those described before, bulking agent, emulsifier, emulsion stabilizer or other agents may be added to the beverage of the present invention. Here, the sweetener includes monosaccharide and disaccharide sweeteners, sugar alcohols, non-caloric sweeteners, and so forth. The monosaccharides and disaccharides here include sucrose, glucose, fructose, high fructose corn syrup, invert syrup, refined syrup, corn syrup, maltose, high maltose syrup, and mixtures thereof. As saccharides, sucrose and high fructose corn syrup are more preferable. The sugar alcohols here include sorbitol, mannitol and xylitol. Examples of the non-caloric sweeteners include aspartame, saccharin, cyclamates, acetosulpham, L-aspartyl-L-phenylalanine lower alkyl ester sweeteners, L-aspartyl-D-alanine amides (cf. U.S. Pat. No. 4,411,925), L-aspartyl-D-serine amides (cf. U.S. Pat. No. 4,399,163), L-aspartylhydroxymethyl alkanamide sweeteners (cf. U.S. Pat. No. 4,338,346), L-aspartyl-1-hydroxyethyl alkanamide sweeteners (cf. U.S. Pat. No. 4,423,029), glycerins, and synthetic alkoxy aromatic compounds. These sweeteners are added so that the resultant beverage have a sugar content (Brix) ranging preferably from 0.01 to 20, more preferably from 0.1 to 20 and even more preferably from 3 to 15. A sugar content higher than 20 in Brix will render the resultant beverage too sugary to drink.

The emulsifiers and emulsion stabilizers herein include, for example, brominated vegetable oils, rosin esters, gums, pectins, cellulose, polysorbates, sorbitan esters, and propylene glycol alginates.

The beverage of the present invention is provided preferably as packed in containers and, for example, it may be produced by mixing together the above-described ingredients (a), (b) and (c) with other ingredients as appropriate, packing the resultant mixture in a container and then sterilizing the beverage as packed. For sterilization, either retort sterilization or UHT (ultraheat treatment) method may be used as appropriate. Here, the containers for packing include metal cans, PET bottles, carton boxes, tube packs, glass bottles, and so forth.

The beverage of the present invention may take a number of forms, including for example juice drinks as mixed with one or more fruit or vegetable juices, carbonated soft drinks, soft drinks comprising no or a smaller quantity of fruit or other juice(s) added thereto, and jelly drinks packed in tube packs.

EXAMPLES

In the preferred embodiments of the present invention, hydroxycarboxylic acids and chlorogenic acids family were analyzed in the following manner.

Analysis of Hydroxycarboxylic Acids

The hydroxycarboxylic acids were quantitatively analyzed by a gas chromatography analysis pursuant to "Analysis of Food Additives in Foods" compiled by Food Chemistry Division, Environmental Health Bureau, Health and Welfare Ministry (now Health, Labour and Welfare Ministry) of Japan, issued by Kodansha Scientific Ltd., Tokyo.

Analysis of Chlorogenic Acids Family

Using an ODS-2 reversed phase column, the chlorogenic acids were eluted by gradient with an eluant A (0.05 M of acetic acid in 3 vol % aqueous acetonitrile solution) and an eluant B (0.05 M of acetic acid in 100 vol % acetonitrile). Each sample was compared in RT (retention time) with a reference standard to identify the analyte.

Preferred Examples 1-18 and Comparative Examples 1-15

Container-packed beverages having formulations shown in Tables 1 through 4 below were prepared and subjected to evaluation for the following criteria:

1. Taste (Bitterness, Astringency, and Foreign Taste)

Sensory evaluation of the beverages was conducted by a panel of 10 selected experts in tasting.

In this connection, placebo beverages not comprising any added chlorogenic acids were used as controls and had their tastes evaluated. The evaluation result is shown in Tables 1 through 4 below.

In Tables 1 through 4, evaluation scores are presented as averages of scores (0 to 4) given by all panelists for the respective samples.

Marking Basis

| | |
|---|---|
| Astringency, bitterness or any foreign taste is felt very strongly: | 4 |
| Astringency, bitterness or any foreign taste is felt strongly: | 3 |
| Astringency, bitterness or any foreign taste is felt: | 2 |
| Astringency, bitterness or any foreign taste is slightly felt: | 1 |
| Astringency, bitterness or any foreign taste is not felt at all: | 0 |

2. Inhibition of dreg formation

After transferring each container-packed beverage under test to a 100 ml clear bottle and closing it securely, the bottled sample was heated to 80° C. and then let stand to cool slowly in a room at 25° C. After 24 hours, each sample was shaken lightly to be observed for any dregs formation therein and ranked based on the following rating criteria.

Rating 1: No dreg formation was observed.
2: Dreg formation was observed a little.
3: Dreg formation was observed definitely.

TABLE 1

| | | Examples | | | | | | |
|---|---|---|---|---|---|---|---|---|
| | | 1 | 2 | 3 | 4 | 5 | 6 | 7 |
| (a) | (Material comprising chlorogenic acid) | 470 mg*1 | 470 mg*1 | 235 mg*5 | 470 mg*5 | 3290 mg*5 | 6580 mg*5 | 470 mg*5 |
| | Isochlorogenic acids | 10 mg | 10 mg | 10 mg | 20 mg | 140 mg | 250 mg | 20 mg |
| | Total chlorogenic acids | 140 mg | 140 mg | 70 mg | 140 mg | 980 mg | 1960 mg | 140 mg |

TABLE 1-continued

|   |   | Examples |   |   |   |   |   |   |
|---|---|---|---|---|---|---|---|---|
|   |   | 1 | 2 | 3 | 4 | 5 | 6 | 7 |
|   | Isochlorogenic acids content ratio | 1/14 | 1/14 | 1/7 | 1/7 | 1/7 | 1/7 | 1/7 |
| (b) | Citric acid | 350 mg | 300 mg | 350 mg | — | 2400 mg | 4800 mg | 250 mg |
|   | Malic acid | 100 mg | — | 100 mg | 300 mg | 600 mg | 1400 mg | 100 mg |
|   | Sodium citrate | 350 mg | 350 mg | 350 mg | 350 mg | 2400 mg | 4800 mg | 450 mg |
|   | (b)/(a) | 5.7 | 5.4 | 11.4 | 5.4 | 5.6 | 5.6 | 5.3 |
| (c) | Water | 97.13 g | 92.88 g | 97.365 g | 92.88 g | 85.31 g | 80.82 g | 96.23 g |
|   | Apple juice*2 | — | 4.4 g | — | 4.4 g | 4.4 g | — | — |
|   | Apple polyphenol*3 | — | — | — | — | — | — | — |
|   | Fructose-glucose*4 | 1.5 g | 1.5 g | 1.5 g | 1.5 g | 1.5 g | 1.5 g | 1.5 g |
|   | Perfume | 0.1 g | 0.1 g | 0.1 g | 0.1 g | 0.1 g | 0.1 g | 0.1 g |
|   | PH | 3.8 | 4.0 | 3.8 | 4.0 | 4.0 | 3.8 | 4.5 |
|   | Brix | 1.21 | 3.41 | 1.38 | 3.75 | 5.86 | 6.11 | 1.55 |
| Evaluation | Taste | 0 | 0 | 0 | 0 | 1 | 1-2 | 1 |
|   | Dreg formation | 1 | 1 | 1 | 1 | 1 | 1 | 1 |

*1 Sunflower extract
*2 Aomori Apple juice, 5-fold condensed (malic acid content 2.5%)
*3 Apple Phenon Powder 50 available from The Nikka Whisky Co., Ltd.
*4 Joint Association of Agricultural Cooperatives of Ehime
*5 Raw coffee beans extract
*6 Isochlorogenic acids (dicaffeoylquinic acid, isolated extract)
*7 Chlorogenic acid (5-caffeoylquinic acid, supplied by Sigma-Aldrich Japan Co. Ltd.)

TABLE 2

|   |   | Comparative examples |   |   |   |   |   |
|---|---|---|---|---|---|---|---|
|   |   | 1 | 2 | 3 | 4 | 5 | 6 |
| (a) | (Material comprising chlorogenic acid) | 245 mg*5 + 70 mg*6 | 140 mg*7 | 375 mg*5 | 70 mg*7 | 470 mg*1 | 360 mg*5 |
|   | Isochlorogenic acids | 80 mg | — | 8 mg | — | 10 mg | 15 mg |
|   | Total chlorogenic acids | 140 mg | 140 mg | 52 mg | 70 mg | 140 mg | 105 mg |
|   | Isochlorogenic acids content ratio | 8/14 | 0 | 2/13 | 0 | 1/14 | 1/7 |
| (b) | Citric acid | — | 300 mg | 2000 mg | — | — | 300 mg |
|   | Malic acid | 800 mg | — | — | — | — | 30 mg acid ascorbic content |
|   | Sodium citrate | — | — | — | — | 400 mg | 20 mg |
|   | (b)/(a) | 5.7 | 2.1 | 38.5 | 1.6 | 2.8 | 3.3 |
| (c) | Water | 97.285 g | 93.56 g | 91.625 g | 93.86 g | 97.53 g | 97.69 g |
|   | Apple juice*2 | — | 4.4 g | 4.4 g | 4.4 g | — | — |
|   | Apple polyphenol*3 | — | — | — | 70 mg | — | — |
|   | Fructose-glucose*4 | 1.5 g | 1.5 g | 1.5 g | 1.5 g | 1.5 g | 1.5 g |
|   | Perfume | 0.1 g | 0.1 g | 0.1 g | 0.1 g | 0.1 g | 0.1 g |
|   | PH | 2.5 | 4.0 | 1.5 | 4.0 | 6.0 | 3.0 |
|   | Brix | 1.39 | 3.40 | 3.69 | 3.40 | 1.21 | 1.47 |
| Evaluation | Taste | 4 | 0 | 3 | 3 | 4 | 3 |
|   | Dreg formation | 1 | 3 | 1 | 3 | 3 | 1 |

*1 Sunflower extract
*2 Aomori Apple juice, 5-fold condensed (malic acid content 2.5%)
*3 Apple Phenon Powder 50 available from The Nikka Whisky Co., Ltd.
*4 Joint Association of Agricultural Cooperatives of Ehime
*5 Raw coffee beans extract
*6 Isochlorogenic acids (dicaffeoylquinic acid, isolated extract)
*7 Chlorogenic acid (5-caffeoylquinic acid, supplied by Sigma-Aldrich Japan Co. Ltd.)

TABLE 3

|   |   | Examples |   |   |   |   |
|---|---|---|---|---|---|---|
|   |   | 8 | 9 | 10 | 11 | 12 |
| (a) | (Material comprising chlorogenic acid-) | 470 mg*1 | 470 mg*6 | 470 mg*7 | 3290 mg*6 | 6580 mg*6 |
|   | Isochlorogenic acids | 10 mg | 20 mg | 30 mg | 140 mg | 280 mg |
|   | Total chlorogenic acids | 140 mg | 140 mg | 140 mg | 980 mg | 1960 mg |
|   | Isochlorogenic | 1/14 | 1/7 | 3/14 | 1/7 | 1/7 |

TABLE 3-continued

|     |                                          |       |       |       |       |       |
|-----|------------------------------------------|-------|-------|-------|-------|-------|
|     | acids/total chlorogenic acids            |       |       |       |       |       |
| (b) | Orange juice*2                           | 11.85 g | 11.85 g | 11.85 g | 3.38 g | 11.85 g |
|     | Lemon juice*3                            | 0.63 g | 0.63 g | 0.63 g | 6.3 g | 0.63 g |
|     | (b)/(a)                                  | 8.71  | 8.71  | 8.71  | 3.36  | 0.62  |
|     | Total flavors of (b)                     | 1.22 g | 1.22 g | 1.22 g | 3.3 g | 1.22 g |
| (c) | Water                                    | 84.55 g | 84.55 g | 84.55 g | 84.53 g | 81.47 g |
|     | Caffeic acid*4                           | —     | —     | —     | —     | —     |
|     | Fructose-glucose*5                       | 1.5 g | 1.5 g | 1.5 g | 1.5 g | 1.5 g |
|     | Perfume                                  | 1 g   | 1 g   | 1 g   | 1 g   | 1 g   |
|     | PH                                       | 3.8   | 3.8   | 3.8   | 3.5   | 3.8   |
| Evaluation | Taste                             | 0     | 0     | 0     | 1     | 1-2   |
|     | Dregs formation                          | 1     | 1     | 1     | 1     | 1     |
|     | Others                                   | —     | —     | —     | (Slightly bitter) | (A little bitter) |

|     |                                          | Comparative examples |     |     |     |     |
|-----|------------------------------------------|-------|-------|-------|-------|-------|
|     |                                          | 7     | 8     | 9     | 10    | 11    |
| (a) | (Material comprising chlorogenic acid-)  | 140 mg*8 | 245 mg*6 + 70 mg*9 | 80 mg*8 | 118 mg*6 + 105 mg*8 | 235 mg*6 |
|     | Isochlorogenic acids                     | —     | 80 mg | —     | 5 mg  | 10 mg |
|     | Total chlorogenic acids                  | 140 mg | 140 mg | 80 mg | 140 mg | 70 mg |
|     | Isochlorogenic acids/total chlorogenic acids | 0 | 8/14 | 0 | 1/28 | 1/7 |
| (b) | Orange juice*2                           | 11.85 g | 11.85 g | 11.85 g | 11.85 g | 3.38 g |
|     | Lemon juice*3                            | 0.63 g | 0.63 g | 0.63 g | 0.63 g | 6.3 g |
|     | (b)/(a)                                  | 8.71  | 8.71  | 15.24 | 8.71  | 47.1  |
|     | Total flavors of (b)                     | 1.22 g | 1.22 g | 1.22 g | 1.22 g | 3.3 g |
| (c) | Water                                    | 84.88 g | 84.715 g | 84.88 g | 84.773 g | 87.585 g |
|     | Caffeic acid*4                           | —     | —     | 60 mg | —     | —     |
|     | Fructose-glucose*5                       | 1.5 g | 1.5 g | 1.5 g | 1.5 g | 1.5 g |
|     | Perfume                                  | 1 g   | 1 g   | 1 g   | 1 g   | 1 g   |
|     | PH                                       | 3.8   | 3.8   | 3.8   | 3.8   | 3.5   |
| Evaluation | Taste                             | 4     | 4     | 3     | 4     | 2     |
|     | Dregs formation                          | 3     | 2     | 2     | 2     | 1     |
|     | Others                                   | (bitter foreign taste) | (Astringent) | (Foreign taste) | (Bitter) | (Taste sour) |

*1 Sunflower extract
*2 65/11-fold concentrated (flavors content 8%), supplied by Joint Association of Agricultural Cooperatives of Ehime
*3 7-fold concentrated (flavors content 43%), supplied by Joint Association of Agricultural Cooperatives of Ehime
*4 Caffeic acid (supplied by Sigma-Aldrich Japan Co. Ltd.)
*5 Joint Association of Agricultural Cooperatives of Ehime
*6 Raw coffee beans extract
*7 Mugwort extract
*8 *8: Chlorogenic acid (5-caffeoylquinic acid, supplied by Sigma-Aldrich Japan Co., Ltd.)
*9 Isochlorogenic acids (dicaffeoylquinic acid, extract)

TABLE 4

|     |                                          | Examples |     |     |     |     |
|-----|------------------------------------------|-------|-------|-------|-------|-------|
|     |                                          | 13    | 14    | 15    | 16    | 17    |
| (a) | (Material comprising chlorogenic acid)   | 380 mg*4 | 10 g*4 | 380 mg*4 | 10 g*4 | 380 mg*4 |
|     | Isochlorogenic acids                     | 16 mg | 490 mg | 16 mg | 490 mg | 16 mg |
|     | Total chlorogenic acids                  | 112 mg | 3430 mg | 112 mg | 3430 mg | 112 mg |
|     | Isochlorogenic acids/total chlorogenic acids | 1/7 | 1/7 | 1/7 | 1/7 | 1/7 |
| (b) | Carrot juice*2                           | 16.67 g | 14.68 g | —     | —     | 16.67 g |
|     | Tomato juice*3                           | —     | —     | 23.2 g | 20.4 g | —     |
|     | (b)/(a)                                  | 10    | 0.21  | 12.75 | 0.36  | 10    |
| (c) | Water                                    | 76.65 g | 69.77 g | 69.27 g | 63.3 g | 77.2 g |
|     | Caffeic acid*4                           | 0.55 g | 0.48 g | 0.15 g | 0.13 g | —     |
|     | Fructose-glucose*5                       | 5.75 g | 5.07 g | 7.0 g | 6.17 g | 5.75 g |
|     | Perfume                                  | —     | —     | —     | —     | —     |
|     | PH                                       | 3.4   | —     | 3.8   | —     |       |
|     | Brix                                     | 11.5  | —     | 10.7  | —     | 8.0   |

TABLE 4-continued

| | | | | | | |
|---|---|---|---|---|---|---|
| Evaluation | Taste | 0 | 1 | 0 | 1 | 0 |
| | Dregs formation | 1-2 | 1 | 1-2 | 1 | 1-2 |
| | Others | — | (Slightly bitter) | — | (Slightly bitter) | — |

| | | Comparative examples | | | | |
|---|---|---|---|---|---|---|
| | | 18 | 12 | 13 | 14 | 15 |
| (a) | (Material comprising chlorogenic acid) | 380 mg*4 | 112 mg*5 | 3430 mg*5 | 112 mg*5 | 3430 mg*5 |
| | Isochlorogenic acids | 16 mg | — | — | — | — |
| | Total chlorogenic acids | 112 mg | 112 mg | 3430 mg | 112 mg | 3430 mg |
| | Isochlorogenic acids/total chlorogenic acids | 1/7 | 0 | 0 | 0 | 0 |
| (b) | Carrot juice*2 | — | 16.67 g | 16.11 g | — | — |
| | Tomato juice*3 | 23.5 g | — | — | 20.1 g | 22.31 g |
| | (b)/(a) | 12.6 | 10 | 0.21 | 12.37 | 0.39 |
| (c) | Water | 69.12 g | 76.568 g | 74.03 g | 72.288 g | 67.0 g |
| | Caffeic acid*4 | — | 0.55 g | 0.53 g | 0.15 g | 0.15 g |
| | Fructose-glucose*5 | 7.0 g | 6.1 g | 5.90 g | 7.35 g | 7.11 g |
| | Perfume | — | — | — | — | — |
| | PH | | 3.4 | — | 3.8 | — |
| | Brix | | 11.5 | — | 10.9 | — |
| Evaluation | Taste | 0 | 3 | 4 | 3 | 4 |
| | Dregs formation | 1-2 | 3 | 2 | 3 | 2 |
| | Others | — | (Foreign taste) | (Foreign taste) | (Foreign taste) | (Foreign taste) |

*1 6-fold concentrated (flavors content 5%), supplied by Joint Association of Agricultural Cooperatives of Ehime
*2 4-fold concentrated tomato juice (flavors content 6%)
*3 Joint Association of Agricultural Cooperatives of Ehime
*4 Raw coffee beans extract
*5 Chlorogenic acid (5-caffeoylquinic acid, supplied by Tokyo Kasei Kogyo Co., Ltd.)

As clearly understood from Tables 1 through 4 above, with isochlorogenic acids weight contents higher than 1/3 of the total ingredient (a) (comparative examples 1 and 8), the resultant beverages exhibited a bitterness and astringency, while with such weight contents lower than 1/20 of the total ingredient (a) (comparative examples 2, 4, 7, 9, 10, 12 through 15), dreg formation was observed in the resultant beverages and thus is not suitable for drinking. Meanwhile, when the weight content of the ingredient (b) was higher than 30 times the weight of the ingredient (a) (comparative examples 3 and 11), the beverage resulted in an overly acid flavor, rendering the beverage unfit for long-lasting drinking. When the weight content of hydroxycarboxylic acids (of ingredient (b)) was lower than 5 times the weight of the ingredient (a) (comparative examples 5 and 6), the beverage exhibited astringency, bitterness or foreign taste. Further, when the weight content of flavor substances (of ingredient (b)) was lower than 0.1 times the content of the ingredient (a), the beverage also exhibited astringency, bitterness or foreign taste.

To the contrary, the beverages embodying the present invention all had a good taste and long-term stability without deposit formation.

Example 19

Jelly Drinks

A mixture of 0.35 wt % of Locust bean gum, 30.0 wt % of a 50% grapefruit juice concentrate (Brix 18), 1.4 wt % of citric acid, 1.1 wt % of sodium citrate and 1.8 wt % of a coffee beans extract ("Flavor Holder" produced by T. Hasegawa Co., Ltd., Tokyo, containing 30 wt % chlorogenic acids family mixture with weight content ratio of isochlorogenic acids to chlorogenic acids mixture of 0.16/1) was prepared, and after adding 16 wt % of a fructose-glucose mixture, water was added thereto until the mixture amounted to 100 wt % as a whole, and the mixture was heated at 65° C. for further dissolution. After adding a small quantity of a grapefruit flavor, the resultant mixture was maintained at 85° C. for 5 minutes for sterilization and then dispensed-into 100 ml receptacles. Thereafter, the mixture was left to stand for 8 hours and then slowly cooled down to 5° C. for its gelation, resulting in a jelly drink which melts well in mouth and having a fruity flavor with a good texture (with Brix 17.5).

Example 20

Fruit Juice Beverage (with Brix 11)

Formulation

| | |
|---|---|
| Orange juice | 70 wt % |
| Carrot juice | 25 wt % |
| Coffee bean extract ("Flavor Holder" produced by T. Hasegawa Co., Ltd., same as that used in the preferred example 5) | 0.4 wt % |
| Lemon juice | 1 wt % |
| Honey | 1.5 wt % |
| Flavor | 0.1 wt % |
| Water | 2.0 wt % |

Chlorogenic Acids and Hydroxycarboxylic Acids Contents—Analytical Values

Total chlorogenic acids content: 120 mg with isochlorogenic acids content of 20 mg (1/6 of total chlorogenic acids)
Citric acid and its salts: 700 mg
Malic acid and its salts: 100 mg
Water: 82.2 g The beverage of this preferred example having the formulation shown above had high storage stability and was delicious with a good flavor.

INDUSTRIAL APPLICABILITY

The present invention is widely applicable in the industry in that it provides a flavorous beverage having a stable antihypertensive action and long-term storage stability.

What is claimed is:

1. A beverage comprising the following ingredients (a), (b) and (c):
    (a) 0.05 to 10% by weight of a chlorogenic acids family mixture comprising isochlorogenic acids wherein the weight ratio of said isochlorogenic acids is from 1/20 to 1/3 of the chlorogenic acids mixture;
    (b) a hydroxycarboxylic acid in a quantity ranging (1) from 5 to 15 times the weight content of said ingredient (a) and (2) from 0.25 to 15% by weight of the beverage, and a vegetable-derived flavor substance in a quantity ranging (1) from 0.1 to 30 times the weight of said ingredient (a) and (2) from 0.25 to 15% by weight of the beverage; and
    (c) 30 to 99.7% by weight of water.

2. The beverage according to claim 1, wherein the beverage has a pH ranging from 2 to 5.

3. The beverage according to claim 1, wherein the beverage has a sugar content ranging from 0.01 to 20 in Brix.

4. The beverage according to claim 1, wherein said ingredient (a) is a plant extract.

5. The beverage according to claim 1, wherein said ingredient (a) is a raw coffee been extract.

6. The beverage according to claim 1, wherein the beverage is packed in a container.

7. The beverage according to claim 1, wherein said chlorogenic acids family mixture comprises isochlorogenic acids, neochlorogenic acids, and cryptochlorogenic acids, and/or salts and/or sugar esters thereof.

8. The beverage according to claim 7, wherein said chlorogenic acids family contains 5-caffeoylquinic acid.

9. The beverage according to claim 7, wherein said cryptochlorogenic acid is a 4-caffeoylquinic acid.

10. The beverage according to claim 7, wherein said neochlorogenic acid is a 3-caffeoylquinic acid.

11. The beverage according to claim 7, wherein said isochlorogenic acid is a dicaffeoylquinic acid in which two caffeic acid molecules are ester-bonded to any two hydroxyl groups out of three hydroxy groups positioned at 3, 4 and 5 of the quinic acid.

12. The beverage according to claim 11, wherein said isochlorogenic acid is selected from the group consisting of 3,4-dicaffeoylquinic acid, 3,5-dicaffeoylquinic acid and 4,5-dicaffeoylquinc acid.

13. The beverage according to claim 1, wherein said a hydroxycarboxylic (b) acid is in a quantity ranging from 5.7 to 15 times the weight content of said ingredient (a).

14. The beverage according to claim 1, wherein said a hydroxycarboxylic (b) acid is in a quantity ranging from 8.71 to 15 times the weight content of said ingredient (a).

15. A beverage comprising the following ingredients (a), (b) and (c):
    (a) 0.05 to 10% by weight of a chlorogenic acids family mixture comprising isochlorogenic acids wherein the weight ratio of said isochlorogenic acids is from 1/20 to 1/3 of the chlorogenic acids mixture;
    (b) a hydroxycarboxylic acid in a quantity ranging (1) from 5 to 15 times the weight content of said ingredient (a) and (2) from 0.25 to 15% by weight of the beverage, and a fruit-derived flavor substance in a quantity ranging (1) from 0.1 to 30 times the weight of said ingredient (a) and (2) from 0.25 to 15% by weight of the beverage; and
    (c) 30 to 99.7% by weight of water.

16. The beverage according to claim 15, wherein the beverage has a pH ranging from 2 to 5.

17. The beverage according to claim 15, wherein the beverage has a sugar content ranging from 0.01 to 20 in Brix.

18. The beverage according to claim 15, wherein said ingredient (a) is a plant extract.

19. The beverage according to claim 15, wherein said ingredient (a) is a raw coffee been extract.

20. The beverage according to claim 15, wherein the beverage is packed in a container.

21. The beverage according to claim 15, wherein said chlorogenic acids family mixture comprises isochlorogenic acids, neochlorogenic acids, and cryptochlorogenic acids, and/or salts and/or sugar esters thereof.

22. The beverage according to claim 21, wherein said chlorogenic acids family contains 5-caffeoylquinic acid.

23. The beverage according to claim 21, wherein said cryptochlorogenic acid is a 4-caffeoylquinic acid.

24. The beverage according to claim 21, wherein said neochlorogenic acid is a 3-caffeoylquinic acid.

25. The beverage according to claim 21, wherein said isochlorogenic acid is a dicaffeoylquinic acid in which two caffeic acid molecules are ester-bonded to any two hydroxyl groups out of three hydroxy groups positioned at 3, 4 and 5 of the quinic acid.

26. The beverage according to claim 25, wherein said isochlorogenic acid is selected from the group consisting of 3,4-dicaffeoylquinic acid, 3,5-dicaffeoylquinic acid and 4,5-dicaffeoylquinc acid.

27. The beverage according to claim 15, wherein said a hydroxycarboxylic (b) acid is in a quantity ranging from 5.7 to 15 times the weight content of said ingredient (a).

28. The beverage according to claim 15, wherein said a hydroxycarboxylic (b) acid is in a quantity ranging from 8.71 to 15 times the weight content of said ingredient (a).

29. A beverage comprising the following ingredients (a), (b) and (c):
    (a) 0.05 to 10% by weight of a chlorogenic acids family mixture comprising isochlorogenic acids wherein the weight ratio of said isochlorogenic acids is from 1/20 to 1/3 of the chlorogenic acids mixture;
    (b) a hydroxycarboxylic acid in a quantity ranging (1) from 5 to 15 times the weight content of said ingredient (a) and (2) from 0.25 to 15% by weight of the beverage; and
    (c) 30 to 99.7% by weight of water.

30. The beverage according to claim 29, wherein the beverage has a pH ranging from 2 to 5.

31. The beverage according to claim 29, wherein the beverage has a sugar content ranging from 0.01 to 20 in Brix.

32. The beverage according to claim 29, wherein said ingredient (a) is a plant extract.

33. The beverage according to claim 29, wherein said ingredient (a) is a raw coffee been extract.

34. The beverage according to claim 29, wherein the beverage is packed in a container.

35. The beverage according to claim 29, wherein said chlorogenic acids family mixture comprises isochlorogenic acids, neochlorogenic acids, and cryptochlorogenic acids, and/or salts and/or sugar esters thereof.

36. The beverage according to claim 35, wherein said chlorogenic acids family contains 5-caffeoylquinic acid.

37. The beverage according to claim 35, wherein said cryptochlorogenic acid is a 4-caffeoylquinic acid.

38. The beverage according to claim 35, wherein said neochlorogenic acid is a 3-caffeoylquinic acid.

39. The beverage according to claim 35, wherein said isochlorogenic acid is a dicaffeoylquinic acid in which two caffeic acid molecules are ester-bonded to any two hydroxyl groups out of three hydroxy groups positioned at 3, 4 and 5 of the quinic acid.

40. The beverage according to claim 39, wherein said isochlorogenic acid is selected from the group consisting of 3,4-dicaffeoylquinic acid, 3,5-dicaffeoylquinic acid and 4,5-dicaffeoylquinc acid.

41. The beverage according to claim 29, wherein said a hydroxycarboxylic (b) acid is in a quantity ranging from 5.7 to 15 times the weight content of said ingredient (a).

42. The beverage according to claim 29, wherein said a hydroxycarboxylic (b) acid is in a quantity ranging from 8.71 to 15 times the weight content of said ingredient (a).

* * * * *

UNITED STATES PATENT AND TRADEMARK OFFICE
CERTIFICATE OF CORRECTION

PATENT NO.       : 7,651,717 B2
APPLICATION NO.  : 10/518372
DATED            : January 26, 2010
INVENTOR(S)      : Shioya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this

Twenty-third Day of November, 2010

David J. Kappos
*Director of the United States Patent and Trademark Office*